United States Patent

[11] 3,577,035

[72] Inventor James M. Constable
 Flushing, N.Y.
[21] Appl. No. 736,231
[22] Filed June 11, 1968
[45] Patented May 4, 1971
[73] Assignee Del Electronics Corp.
 Mount Vernon, N.Y.

[54] POWER TRANSISTOR PROTECTION CIRCUIT
 12 Claims, 1 Drawing Fig.
[52] U.S. Cl. .................................................. 317/31,
 317/33, 323/9, 323/20
[51] Int. Cl. .................................................. H02h 3/08,
 H02h 3/20
[50] Field of Search .......................................... 323/20, 9,
 22 (T); 317/31, 33

[56] References Cited
UNITED STATES PATENTS
2,915,693 12/1959 Harrison.................... 317/31X
3,335,358 8/1967 Schultz...................... 323/9

Primary Examiner—J. D. Miller
Assistant Examiner—Harvey Fendelman
Attorney—James and Franklin ABSTRACT: A protection circuit is operatively connected to a power transistor in a power supply control circuit. Means are provided to derive signals representative of the current flow through the power transistor and to the voltage across that transistor, and to sum those signals. At excessive, unsafe current and voltage levels in the power transistor, that sum will exceed a predetermined value, and will be effective to decrease the current flowing through the power transistor.

PATENTED MAY 4 1971　　　　　　　　　　　　　　3,577,035
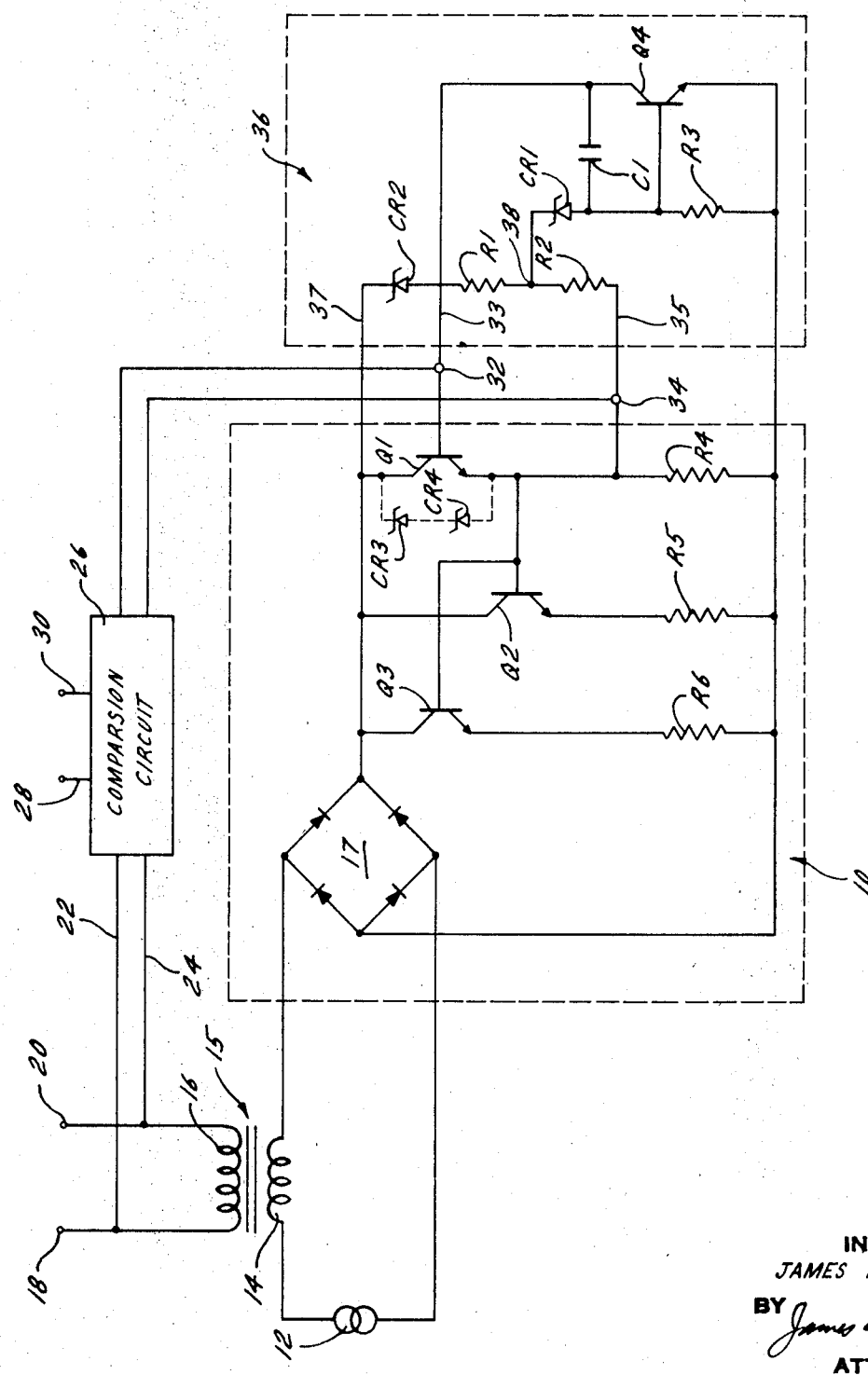
INVENTOR
JAMES M. CONSTABLE
BY *James A. Franklin*
ATTORNEY

POWER TRANSISTOR PROTECTION CIRCUIT

The present invention relates to a protection circuit and, in particular, to a protection circuit for use in conjunction with a power supply control circuit.

Control circuits are commonly employed in power supplies, usually in conjunction with other circuits, to sample a power supply output parameter such as voltage, and to compare this sampled parameter with a stable reference voltage. When the level of the power supply output varies either above or below its desired level, a control signal is developed which is effective in the control circuit to restore the power supply output to its desired level.

In one commonly used control circuit, a power transistor is connected in series with the AC source and the primary winding of the high voltage power supply transformer. The relative conductivity of the power transistor determines the proportion of the AC source signal applied to the primary winding, and thus controls the output voltage developed at the secondary winding of the high voltage transformer. It has, however, been found that there is danger of overloading and damaging the power transistor utilized in the control circuit during the occurrence of high level transients, particularly during the turn-on of the power supply, or as a result of a short circuit in the power supply output. There are also times at which the power transistors will operate at unsafe current and/or voltage levels even during steady state short circuit conditions.

Protection circuits of the type for preventing overload operating conditions of a power transistor in a power supply control circuit are known in which either only the primary current or voltage is sampled, and upon the current or the voltage exceeding a predetermined safe level, a switch is activated to decrease the conductivity or turn off the protected transistor, or to divert the input signal therefrom.

However, in cases in which current is the only sensed parameter, an excessive or unsafe voltage across the power transistors would not have any effect, and thus for this unsafe voltage condition there would be no protection for the power transistor. Similarly, where the protection circuit samples only the voltage level across the power transistor, an excessive current flow would not be detected until after the unsafe conditions had harmfully affected the power transistor. Furthermore, safe operating conditions for a power transistor are generally determined not by current or by voltage alone, but rather by a combination of the two; that is, the transistor may operate in a safe region for a given voltage at one current level, whereas at an increased current level that voltage would be unsafe. Similarly, safe operation may be obtained at one input current for a given voltage level, but with a higher voltage that current would be unsafe.

It is therefore, an object of the present invention to provide a power supply transistor protection circuit which senses both the voltage across and the current through the power transistor itself, thereby to develop a protective signal for unsafe transistor operating conditions representative of both the voltage and the current, which signal is then effective to decrease the conductivity of the power transistor.

It is a further object of the present invention to provide a circuit for protecting a power transistor in a power supply control circuit from excessive transient levels of current or voltage, in which the protection circuit is responsive to a protective signal developed by sampling both the current through and the voltage across the power transistor.

It is a further object of the present invention to provide a reliable and accurate protection circuit for preventing damage to a power transistor in a power supply control circuit due to the operation of the power transistors at unsafe voltage and/or current levels, which requires minimum additional circuit elements to achieve its purpose.

It is yet another object of the present invention to develop a power transistor protection circuit which is effective to reduce the conductivity of the power transistor in the presence of excessive combined current and voltage, thereby to prevent damage to the power transistor and to effectively turn off, wholly or partially, the power supply controlled by that power transistor.

It is still a further object of the present invention to provide a power transistor protection circuit in which the power transistor is effectively and quickly turned off at the time that the sum of the instantaneous current through the power transistor and the voltage across the transistor exceed a predetermined value.

Briefly described, the protection circuit of the present invention provides means for sensing both the current flow through a control power transistor and the voltage across the transistor, and for developing a pair of signals representative of each of these sensed parameters. These signals are summed and compared to a voltage reference. When the sum of these sensed signals exceeds the level of the reference, a third or protective signal is developed, which signal, whenever it is present, is applied to a protective switch connected in effective bypass relationship with the control electrode of the power transistor. The protective signal is effective to change the switch from its normal off or nonconductive condition, to the on or conducting condition, whereby it bypasses the base circuit of the power transistor, thus reducing its conductivity. In this way the power supply output, and hence the load on the power transistor, is reduced.

The protective signal is developed only when the combined current through and voltage across the power transistor exceed a predetermined value for safe operation of the power transistor. In this manner, the power transistor is effectively and accurately protected from harmful excessive voltage and/or current levels.

To the accomplishment of the above, and to such other objects as may hereinafter appear, the present invention relates to a power transistor protection circuit as defined in the appended claims and as illustrated in the accompanying DRAWING which is a schematic diagram of an exemplary embodiment of the protection circuit of the present invention in circuit connection with a typical transistorized power supply control circuit.

In the circuit here illustrated, a power transistor control circuit generally designated 10 is effective to control the proportion of the AC power produced by AC source 12 which is applied to primary winding 14 of a high voltage transformer generally designated 15. The high voltage developed at the secondary winding 16 of the transformer 15 is applied to a load (not shown) at terminals 18 and 20. A portion of this secondary voltage is sampled by leads 22 and 24 and is applied to a comparison circuit 26, at which the sampled output voltage is compared with a stable reference voltage applied at input terminals 28 and 30. When the sampled output voltage deviates either above or below the reference voltage, a control signal is developed and applied to the input terminals 32 and 34 of power transistor control circuit 10. This control signal is effective to establish the relative state of conductivity of the power transistors in control circuit 10, here shown as comprising three such power transistors, Q1, Q2 and Q3. The circuit between AC source 12 and primary winding 14 is completed by means of a full-wave rectifier bridge circuit 17 and the parallel conduction paths provided through the collector-emitter circuits of power transistors Q1, Q2 and Q3 when these transistors are operating in their conducting or "on" states. The circuit would operate with only a single power transistor Q1, the conductivity of which is controlled by the signal applied to its base. More than one power transistor is employed when large amounts or power are to be handled, the conductivity of transistors Q2 and Q3 following that of Q1 in conventional Darlington fashion. In the discussion to follow only Q1 will be referred to, it being understood that Q2 and Q3 will be correspondingly affected.

When the power transistor is fully turned off by the control signal applied at input terminals 32 and 34, the AC conduction path between source 12 and primary winding 14 is effectively open, and the supply voltage is effectively cut off from primary winding 14. When the power transistor Q1 is turned fully on by the control signal, the entire line voltage from source 12 will be applied across primary winding 14 of transformer 15. In practice, however, power transistor Q1, is generally biased into a conducting state somewhere between the completely on and off conditions as a result of the control signal derived from comparison circuit 26. Depending upon whether the voltage output at secondary winding 16 is either too low or too high, this control signal will either be reduced or increased so as to vary the conductivity of the power transistor and thus return the power supply output to its desired level.

Operating difficulties often arise in the use of power transistors which cause the power transistors to operate outside of their safe operating regions. It has been found that transistor failure as a result of burnout has been caused by transients occurring during the power supply turn-on during short circuit conditions in the power supply load. In some instances the power transistor will be caused to operate outside its safe operating regions at steady state short circuit conditions.

To protect the power transistor Q1 of control circuit 10 from operating at excessive and harmful currents and/or voltages, a protection circuit generally designated 36 is provided having a pair of leads 33 and 35 connected to input terminals 32 and 34 of control circuit 10, and a third lead 37 connected to the collector terminal of the power transistor Q1. Protection circuit 36 comprises a protective switch in the form of transistor Q4 which is capable of operating either in the on or off condition, that condition being determined by the presence or absence of a protective signal at its base. This protective signal is derived by summing a first signal corresponding to the emitter-to-collector current flow in power transistor Q1 and a second signal representative of the voltage across the collector-emitter circuit of power transistor Q1, that sum being compared to a reference voltage which, as specifically disclosed herein, is the constant Zener voltage of a Zener diode CR–1, connected between a junction point 38 between resistors R1 and R2, and the base of transistor Q4. Transistor Q4 comprises the conventional base, emitter and collector terminals, the base being connected to ground through base resistor R3, the emitter being directly connected to ground, and the collector being connected to input terminal 32 via lead 33.

The emitter current flowing in power transistor Q1 flows through a resistor R4 in the ground emitter circuit of the transistor, and produces a voltage thereacross. The voltage between the collector and emitter of power transistor Q1 is effectively applied across the series combination of resistors R1 and R2, the potential across resistor R2 therefore being a known portion of the voltage present across power transistor Q1. The voltage developed across resistor R4, corresponding to the emitter-to-collector current of power transistor Q1, and the voltage developed across resistor R2, representative of the voltage across power transistor Q1, added together, are applied across the normally nonconducting Zener diode CR1. When the sum of these voltages exceeds the Zener voltage of Zener diode CR1, diode CR1 will break down and conduct. When this occurs, a third, or protective, signal will be developed which is applied to the base of protective switch transistor Q4. Upon receipt of this protective signal, transistor Q4, which is normally biased in the off or nonconducting state, is turned on to provide a bypass to ground for the base input circuit of power transistor Q1, so that the control signal applied at input terminals 32 and 34 will now be diverted through switch transistor Q4, instead of being applied to the base of power transistor Q1. As a result of such diversion of the control signal from power transistor Q1, the conductivity of power transistor Q1 will be sharply reduced and it will be effectively turned off, or substantially so. This will effectively turn off, or markedly reduce, the output of the power supply, since a greatly reduced AC signal, or no such signal at all, will now be applied to primary winding 14. Since switch transistor Q4 is turned on only at excessive combined voltage and current levels at power transistor Q1, the resulting turning off or reduction of the conductivity of power transistor Q1 at these unsafe operating levels by the operation of protection circuit 36 will effectively prevent damage to transistor Q1.

It will be noted that the protective signal derived to turn on switch transistor Q4 is representative of both the voltage and the current levels of power transistor Q1. The relative weighting of each of these parameters on the operation of protection circuit 36 is determined by a selection of the resistance value of resistor R4 and the voltage division determined by the relative resistance values of resistors R1 and R2. As safe operation of power transistor Q1 is largely a function of its emitter-collector current flow, it may be desired to modify the voltage sensing operation, that is, the voltage sampled across resistor R2 and representative of the voltage across the collector-emitter circuit of power transistor Q1. To this end, a second Zener diode CR2 may be connected in series between the collector of power transistor Q1 and one end of resistor R1. The provision of Zener diode CR2 will thus cause current flow in resistors R1 and R2, and thus, a voltage representative signal, only when the voltage applied across power transistor Q1 exceeds the Zener voltage of Zener diode CR2. Zener diode CR2 having a predetermined Zener voltage may be selected to achieve the proper modification of the voltage sensing signal derivation to more suitably fit the voltage and current characteristics of power transistor Q1 for safe operation of that transistor.

As the power transistor Q1 is in circuit arrangement with the inductive primary winding 14 of the transformer 15, the rapid turnoff of the power transistor Q1 by the action of protection circuit 36 will tend to develop a relatively high voltage at the primary 14 of transformer 15. To prevent the overly rapid turning off of the power transistor, a capacitor C1 is connected between the collector and base terminals of switch transistor Q4 to delay the response of switch transistor Q4 to the presence of the protective signal. The response of switch transistor Q4 with the capacitor C1 connected in this manner will still be sufficiently rapid at 60-cycle operation to protect the power transistors of control circuit 10, but will be sufficiently slow to prevent an excessive rate of change of voltage in primary winding 14 which would cause and excessive voltage to be developed thereat and thus at the secondary winding 16. Zener diodes CR3 and CR4 may be connected in series between the collector and emitter of power transistor Q1 to provide a current path during the times that power transistor Q1 is turned off or substantially so by the operation of protection circuit 36, but when transformer action tends to form relatively high currents at excessively high voltages through power transistor Q1.

Emitter resistors R5 and R6 for power transistors Q2 and Q3 respectively are preferably substantially equal and also equal to the resistance value of emitter resistor R4 of transistor Q1. In practice, any required number of such power transistors may be provided in control circuit 10 to satisfy the power-handling requirements for normal power supply operation. The protection of power transistor Q1 by the operation of protection circuit 36 automatically protects power transistors Q2 and Q3 — their drive follows that of Q1, but is slightly less because of the base-emitter voltage drop of Q1.

Thus, a protection circuit has been provided which is effective to sense both the current and voltage levels in the power transistor of a power supply control circuit having any required number of power transistors provided therein, and which upon excessive current and/or voltage levels in the protected transistor develops a protective signal which is applied to a transistor switch connected in effective bypass relationship with the input to the power transistors. As a result, at these unsafe operating conditions of the power transistors, the input signal is diverted from the power transistor to ground through the switching transistor, thus reducing the conductivity of the power transistor and hence the current flowing therethrough so as to prevent operation of the power transistor at unsafe operating conditions. This protection is accurately, quickly and effectively achieved by the addition of only a relatively few commonly used circuit elements which add little to the complexity or cost of the overall power supply control system.

While only a single embodiment of the present invention has been herein specifically disclosed, it will be apparent that many variations may be made thereto without departure from the scope of the invention as described in the following claims.

I claim:

1. In a power supply control circuit comprising a power transistor receiving a control signal corresponding to a comparison of the power supply output and a reference, thereby to vary the conductivity of said power transistor, and hence the level of the output, in response to said control signal, the improvement which comprises: a protection circuit for said power transistor comprising means for sensing the current in said power transistor and for deriving a first signal representative thereof, means for sensing the voltage applied across said power transistor and for deriving a second signal representative thereof, and protective means responsive to the sum of said first and second signals, operatively connected to the input of said power transistor, and effective when said sum exceeds a predetermined value to modify said control signal to decrease the conductivity of said power transistor said protective means comprising switch means operatively connected to said power transistor and effective to bypass said control signal from said power transistor when actuated, means for comparing said sum of said first and second signals with a constant voltage reference, the latter comprising means for determining said predetermined value, said constant voltage reference comprising a Zener diode in operative connection with said protective means.

2. The protection circuit of claim 1, in which said protective means comprises a semiconductor device effective to operate in the conducting state when said signals sum exceeds said predetermined value.

3. The protection circuit of claim 1, in which said protective means comprises a transistor having said Zener diode operatively connected in the base circuit thereof.

4. In a power supply control circuit comprising a power transistor receiving a control signal corresponding to a comparison of the power supply output and a reference, thereby to vary the conductivity of said power transistor, and hence the level of the output, in response to said control signal, the improvement which comprises: a protection circuit for said power transistor comprising means for sensing the current in said power transistor and for deriving a first signal representative thereof, means for sensing the voltage applied across said power transistor and for deriving a second signal representative thereof, and protective means responsive to the sum of said first and second signals, operatively connected to the input of said power transistor, and effective when said sum exceeds a predetermined value to modify said control signal to decrease the conductivity of said power transistor, said protective means comprising switch means operatively connected to said power transistor and effective to bypass said control signal from said power transistor when actuated, and means connected in circuit with said protective means and effective to delay the response of said protective means to said signal's sum when the latter exceeds said predominant value, and in which said protective means comprises a transistor having a base, emitter and collector terminal, said delaying means comprising a capacitor connected between said collector and said base terminal.

5. In a power supply control circuit comprising a power transistor receiving a control signal corresponding to a comparison of the power supply output and a reference, thereby to vary the conductivity of said power transistor, and hence the level of the output, in response to said control signal, the improvement which comprises: a protection circuit for said power transistor comprising means for sensing the current in said power transistor and for deriving a first signal representative thereof, means for sensing the voltage applied across said power transistor and for deriving a second signal representative thereof, and protective means responsive to the sum of said first and second signals, operatively connected to the input of said power transistor, and effective when said sum exceeds a predetermined value to modify said control signal to decrease the conductivity of said power transistor, said first signal being a first voltage proportional to the current in said power transistor, and said second signal being a second voltage proportional to the voltage across said power transistor, means for comparing said sum of said first and second signals with a constant voltage reference, the latter comprising means for determining said predetermined value, said constant voltage reference comprising a Zener diode in operative connection with said protective means.

6. The protection circuit of claim 5, in which said protective means comprises a semiconductor device effective to operate in the conducting state when said signals sum exceeds said predetermined value.

7. The protection circuit of claim 5, in which said protective means comprises a transistor having said Zener diode operatively connected in the base circuit thereof.

8. The protection circuit of claim 5, comprising means connected in circuit with said protective means and effective to delay the response of said protective means to said signals sum when the latter exceeds said predetermined value.

9. The protection circuit of claim 8, in which said protective means comprises a transistor having a base, emitter and collector terminal, said delaying means comprising a capacitor connected between said collector and said base terminal.

10. The protection circuit of claim 5, in which said voltage-sensing means further comprises voltage-limiting means effective to derive said second signal at said voltage-sensing means only when the voltage input across said power transistor exceeds a second predetermined level, said second predetermined level being established by said voltage-limiting means.

11. In a power supply control circuit comprising a power transistor receiving a control signal corresponding to a comparison of the power supply output and a reference, thereby to vary the conductivity of said power transistor, and hence the level of the output, in response to said control signal, the improvement which comprises: a protection circuit for said power transistor comprising means for sensing the current in said power transistor and for deriving a first signal representative thereof, means for sensing the voltage applied across said power transistor and for deriving a second signal representative thereof, and protective means responsive to the sum of said first and second signals, operatively connected to the input of said power transistor, and effective when said sum exceeds a predetermined value to modify said control signal to decrease the conductivity of said power transistor, means for comparing said sum of said first and second signals with a constant voltage reference, the latter comprising means for determining said predetermined value, said constant voltage reference comprising a Zener diode in operative connection with said protective means, said protective means comprising a transistor having said Zener diode connected in the base circuit thereof.

12. In a power supply control circuit comprising a power transistor receiving a control signal corresponding to a comparison of the power supply output and a reference, thereby to vary the conductivity of said power transistor, and hence the level of the output, in response to said control signal, the improvement which comprises: a protection circuit for said power transistor comprising means for sensing the current in said power transistor and for deriving a first signal representative thereof, means for sensing the voltage applied across said power transistor and for deriving a second signal representative thereof, and protective means responsive to the sum of said first and second signals, operatively connected to the input of said power transistor, and effective when said sum exceeds a predetermined value to modify said control signal to decrease the conductivity of said power transistor, comprising means connected in circuit with said protective means, and effective to delay the response of said protective means to said signal's sum when the latter exceeds said predominant value, in which said protective means comprises a transistor having a base, emitter and collector terminal, said delaying means comprising a capacitor connected between said collector and said base terminal.